United States Patent
Zhang et al.

(10) Patent No.: US 8,724,997 B2
(45) Date of Patent: May 13, 2014

(54) LONG-DISTANCE BOX AND METHOD FOR PROCESSING UPLINK AND DOWNLINK LIGHTS THEREOF

(75) Inventors: Dezhi Zhang, Shenzhen (CN); Jidong Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 37 days.

(21) Appl. No.: 13/581,798

(22) PCT Filed: Nov. 22, 2010

(86) PCT No.: PCT/CN2010/078962
§ 371 (c)(1),
(2), (4) Date: Aug. 29, 2012

(87) PCT Pub. No.: WO2011/137642
PCT Pub. Date: Nov. 10, 2011

(65) Prior Publication Data
US 2012/0321317 A1    Dec. 20, 2012

(30) Foreign Application Priority Data
May 1, 2010    (CN) .......................... 2010 1 0173400

(51) Int. Cl.
*H04J 14/00*    (2006.01)
(52) U.S. Cl.
USPC ................................. 398/72; 398/70; 398/71
(58) Field of Classification Search
USPC ...................................... 398/68–72
See application file for complete search history.

(56) References Cited

U.S. PATENT DOCUMENTS

| | | | |
|---|---|---|---|
| 2008/0137179 A1 | 6/2008 | Li et al. | |
| 2009/0010650 A1* | 1/2009 | Tsuchiya et al. | 398/59 |
| 2009/0175619 A1* | 7/2009 | Effenberger et al. | 398/38 |
| 2010/0196011 A1* | 8/2010 | Liu et al. | 398/79 |
| 2011/0158650 A1* | 6/2011 | Cavaliere et al. | 398/79 |
| 2012/0315047 A1* | 12/2012 | Iannone et al. | 398/72 |

FOREIGN PATENT DOCUMENTS

| | | |
|---|---|---|
| CN | 1845485 A | 10/2006 |
| CN | 101453671 A | 6/2009 |
| CN | 101630979 A | 1/2010 |

(Continued)

OTHER PUBLICATIONS

International Search Report in international application No. PCT/CN2010/078962, mailed on Mar. 3, 2010.

(Continued)

*Primary Examiner* — Dzung Tran
(74) *Attorney, Agent, or Firm* — Oppedahl Patent Law Firm LLC

(57) ABSTRACT

The disclosure provides a long-distance box and a method for processing uplink/downlink light thereof. The method includes that: the uplink/downlink light (uplink light and downlink light) from different PON systems is split, and the uplink/downlink light from different PON systems is transmitted through different optical paths; and the uplink/downlink light from different PON systems is processed by long-distance boxes belonging to corresponding systems in different optical paths, and then output to the OLTs/ONUs of respective systems. By means of the method provided in the disclosure, a simple and reliable solution is provided for operators to solve the long-distance problem caused by the coexistence of multiple PON systems; furthermore, in the disclosure, modification for the system is slightest, reliability of the system is highest, and an efficiency of the system is highest, so that time and cost are saved for the operators.

4 Claims, 3 Drawing Sheets

(56) References Cited

FOREIGN PATENT DOCUMENTS

| EP | 1942565 A2 | 7/2008 |
| JP | 2010252044 A | 11/2010 |
| KR | 20060105305 A | 10/2006 |

OTHER PUBLICATIONS

English Translation of the Written Opinion of the International Search Authority in international application No. PCT/CN2010/078962, mailed on Mar. 3, 2010.

McCammon and Wong, Experimental Validation of an Access Evolution Strategy: Smooth FTTP Service Migration Path, 1 page, Mar. 2007.

Nadarajah, Tran, and Chae, 10 Gb/s Upgrade for High-Split and Long-Reach PON Using Remote Repeater, Jul. 7, 2008 [ p. 1 ].

Effenberger and Kani, Trends in Standardization of Optical Access Networks in ITU-P, Feb. 1, 2010 [ p. 256-p. 258 ].

ITU-T, G.987.1, Series G: Transmission Systems and Media Digital Systems and Networks, Digital sections and digital line system—Optical line systems for local and access networks, 10-Gigabit-capable passive optical networks, Jan. 13, 2010.

Supplementary European Search Report in European application No. 10851011.6, mailed on Feb. 18, 2014.

\* cited by examiner

LONG-DISTANCE BOX AND METHOD FOR PROCESSING UPLINK AND DOWNLINK LIGHTS THEREOF

TECHNICAL FIELD

The disclosure relates to a coexisting Passive Optical Network (PON) system in the filed of optical networks, and in particular to a long-distance box and a method for processing uplink and downlink lights thereof.

BACKGROUND

A rapid development and low cost requirement of a cable wideband access technology promote a development of gradually replacing an existing copper (cable) system with optical fiber, that is, exit of copper and development of the optical fiber have become a trend. Simultaneously, with broadest, fastest and most environmentally friendly features of PON, and with features of a long-distance PON having a structure for a flat and simplified network, and advantages such as adaptation to a network structure with a long distance, reduced investment cost and the like, PON is being accepted by most operators and starts to or is ready to be deployed, in order to satisfy gradually increased communication users and demand of the users for faster and better service.

A long-distance PON is a point-to-multipoint optical fiber access technology. FIG. 1 shows a structure diagram of a long-distance passive optical network in the prior art, and as shown in FIG. 1, the long-distance passive optical network includes an Optical Line Terminal (OLT), an Optical Network Unit (ONU) and an Optical Distribution Network (ODN). Generally, one OLT is connected with multiple ONUs through a light reach extender box (also called long-distance box) and a light power separator (short for optical splitter) to form a point-to-multipoint structure.

In order to reduce investment cost and achieve multiplexing of ODN, several PON systems (hereinafter referred to as coexisting PON system) may share one ODN in a passive optical network. FIG. 2 shows a structure diagram of a coexisting long-distance passive optical network, as shown in FIG. 2, as different PON systems, such as, a PON system with coexistence of such two kinds of PONS: a GPON and an XG-PON, generally have different uplink and downlink wavelengths, wherein the downlink wavelength of a GPON is 1480 nm-1500 nm and the uplink wavelength of the GPON is 1290 nm-1330 nm, while the downlink wavelength of an XG-PON is 1575 nm-1581 nm and the uplink wavelength of the XG-PON is 1260 nm-1280 nm, the two PON systems can share one ODN through a WDM1r wavelength division multiplexing filter, as shown in FIG. 2, the long-distance box in the prior art is mainly designed for a single-PON system, for a system in which multiple PONS coexist, long-distance boxes for a single-PON system cannot be used for such the system in which the multiple PONS coexist, therefore a synthetic long-distance box is required to satisfy such demand.

SUMMARY

In view of the problem above, the main purpose of the disclosure is to provide a long-distance box and a method for processing uplink and downlink lights thereof, capable of being reliably applied in a case where multiple different Passive Optical Networks (PON) systems run in one ODN.

In order to achieve the purpose, the technical solution of the disclosure is realized as follows.

A long-distance box for a system in which different PON system coexist includes a long-distance amplification box and a wavelength division multiplexing filter;

the system in which the different PON systems coexist includes a first PON system and a second PON system;

the long-distance amplification box is configured to process uplink/downlink lights from PON systems, which passes through an optical path in which the long-distance amplification box is located, the long-distance amplification box comprises a first long-distance amplification box located in a first optical path and a second long-distance amplification box located in a second optical path;

the wavelength division multiplexing filter comprises a first wavelength division multiplexing filter and a second wavelength division multiplexing filter; wherein, the first wavelength division multiplexing filter is configured to split the downlink lights and couple the uplink lights from different PON systems, the uplink/downlink light from the first PON system is transmitted through the first optical path and amplified by the first long-distance amplification box, and the uplink/downlink light from the second PON system is transmitted through the second optical path and amplified by the second long-distance amplification box; and the uplink lights transmitted through the first optical path and the second optical path are coupled to a trunk optical fiber through the first wavelength division multiplexing filter; and the second wavelength division multiplexing filter is configured to split the uplink lights and couple the downlink lights from different PON systems: the uplink/downlink light from the first PON system is transmitted through the first optical path and amplified by the first long-distance amplification box, and the uplink/downlink light from the second PON system is transmitted through the second optical path and amplified by the second long-distance amplification box; and the downlink lights transmitted through the first optical path and the second optical path are coupled to the trunk optical fiber through the second wavelength division multiplexing filter.

The wavelength division multiplexing filter may consist of filtering sheets with double windows and include an interface R, an interface P and an interface C; the uplink/downlink light from the first PON system may be reflected and input/output through the interface R, the uplink/downlink light from the second PON system may be transmitted and input/output through the interface P; and the interface C may be connected with the trunk optical fiber;

the interface C of the first wavelength division multiplexing filter may be connected with the trunk optical fiber at an Optical Line Terminal (OLT) side, the interface R of the first wavelength division multiplexing filter may be connected with one end of the first long-distance amplification box in the first optical path, and the interface P of the first wavelength division multiplexing filter may be connected with one end of the second long-distance amplification box in the second optical path; the interface C of the second wavelength division multiplexing filter may be connected with the trunk optical fiber at an Optical Network Unit (ONU) side, the interface R of the second wavelength division multiplexing filter may be connected with the other end of the first long-distance amplification box in the first optical path, and the interface P of the second wavelength division multiplexing filter may be connected with the other end of the second long-distance amplification box in the second optical path.

The downlink light from the first PON system may be emitted by the OLT of the first PON system, transmitted to the interface C of the first wavelength division multiplexing filter through the trunk optical fiber, output to the first optical path through the interface R of the first wavelength division multiplexing filter, output to the interface R of the second wavelength division multiplexing filter by the first long-distance amplification box corresponding to the first PON system, then output to the trunk optical fiber through the interface C of the second wavelength division multiplexing filter, and finally transmitted to the ONU through a light splitter and a branch optical fiber;

the uplink light from the first PON system may be emitted by the ONU of the first PON system, transmitted to the interface C of the second wavelength division multiplexing filter through the branch optical fiber and the light splitter, output to the first optical path through the interface R of the second wavelength division multiplexing filter, output to the interface R of the first wavelength division multiplexing filter by the first long-distance amplification box corresponding to the first PON system, then output to the trunk optical fiber through the interface C of the first wavelength division multiplexing filter, and finally transmitted to the OLT of the first PON system;

the downlink light from the second PON system may be emitted by the OLT of the second PON system, transmitted to the interface C of the first wavelength division multiplexing filter through the trunk optical fiber, output to the second optical path through the interface P of the first wavelength division multiplexing filter, output to the interface P of the second wavelength division multiplexing filter by the second long-distance amplification box corresponding to the second PON system, then output to the trunk optical fiber through the interface C of the second wavelength division multiplexing filter, and finally transmitted to the ONU through the light splitter and the branch optical fiber; and the uplink light from the second PON system may be emitted by the ONU of the second PON system, transmitted to the interface C of the second wavelength division multiplexing filter through the branch optical fiber and the light splitter, output to the second optical path through the interface P of the second wavelength division multiplexing filter, output to the interface P of the first wavelength division multiplexing filter by the second long-distance amplification box corresponding to the second PON system, then output to the trunk optical fiber through the interface C of the first wavelength division multiplexing filter, and finally transmitted to the OLT of the second PON system.

The long-distance amplification box may be an uplink/downlink Optical-Electrical-Optical (OEO) box belonging to the PON system, or an uplink/downlink Optical Amplification (OA) box, or a combination of uplink/downlink OEO box and OA box and corresponding light guide devices.

The first PON system may be a G-PON (Gigabit PON) system; and the second PON system may be a 10G-PON (ten-Gigabit PON) system.

A method for processing uplink and downlink light with the long-distance box includes:

the uplink/downlink light from different PON systems is split, and the uplink/downlink light from different PON systems is transmitted through different optical paths; and the uplink/downlink light from different PON systems is processed in different optical paths by the corresponding long-distance amplification boxes, and then output to the OLTs/ONUs of respective systems.

The system in which the different PON systems coexist may include a first PON system and a second PON system; the method may specifically include:

the downlink light from the first PON system is emitted by the OLT of the first PON system, transmitted to an interface C of the first wavelength division multiplexing filter through the trunk optical fiber, output to the first optical path through an interface R of the first wavelength division multiplexing filter, output to an interface R of the second wavelength division multiplexing filter by the first long-distance amplification box corresponding to the first PON system, then output to the trunk optical fiber through an interface C of the second wavelength division multiplexing filter, and finally transmitted to the ONU through a light splitter and a branch optical fiber;

the uplink light from the first PON system is emitted by the ONU of the first PON system, transmitted to the interface C of the second wavelength division multiplexing filter through the branch optical fiber and the light splitter, output to the first optical path through the interface R of the second wavelength division multiplexing filter, output to the interface R of the first wavelength division multiplexing filter by the first long-distance amplification box corresponding to the first PON system, then output to the trunk optical fiber through the interface C of the first wavelength division multiplexing filter, and finally transmitted to the OLT of the first PON system;

the downlink light from the second PON system is emitted by the OLT of the second PON system, transmitted to the interface C of the first wavelength division multiplexing filter through the trunk optical fiber, output to the second optical path through the interface P of the first wavelength division multiplexing filter, output to the interface P of the second wavelength division multiplexing filter by the second long-distance amplification box corresponding to the second PON system, then output to the trunk optical fiber through the interface C of the second wavelength division multiplexing filter, and finally transmitted to the ONU through the light splitter and the branch optical fiber; and the uplink light from the second PON system is emitted by the ONU of the second PON system, transmitted to the interface C of the second wavelength division multiplexing filter through the branch optical fiber and the light splitter, output to the second optical path through the interface P of the second wavelength division multiplexing filter, output to the interface P of the first wavelength division multiplexing filter by the second long-distance amplification box corresponding to the second PON system, then output to the trunk optical fiber through the interface C of the first wavelength division multiplexing filter, and finally transmitted to the OLT of the second PON system.

It can be seen from the technical solution of the disclosure that, the uplink/downlink light (uplink light and downlink light) from different PON systems is split, and the uplink/downlink light from the different PON systems is transmitted through different optical paths; and the uplink/downlink light from the different PON systems is is processed in different optical paths by the corresponding long-distance boxes, and then output to the OLTs/ONUs of respective systems. In the method of the disclosure, by splitting the uplink/downlink light from different PON systems to different optical paths and setting long-distance amplification boxes corresponding to the split PON systems in different optical paths, a simple and reliable solution is provided for operators to solve the long-distance problem caused by the coexistence of multiple PON systems; furthermore, long-distance amplification boxes of multiple existing single-PON systems are combined organically in the disclosure, modification for the system is slightest, reliability of the system is highest, and an efficiency of the system is highest, therefore time and cost are saved for the operators.

DETAILED DESCRIPTION

The basic idea of the disclosure is that: uplink/downlink light (uplink light and downlink light) from different PON systems is split, and the uplink/downlink light from the different PON systems is transmitted through different optical paths; and the uplink/downlink light from the different PON systems is processed in different optical paths by long-distance boxes belonging to corresponding systems, and then output to OLTs/ONUs of respective systems.

Figure 1:
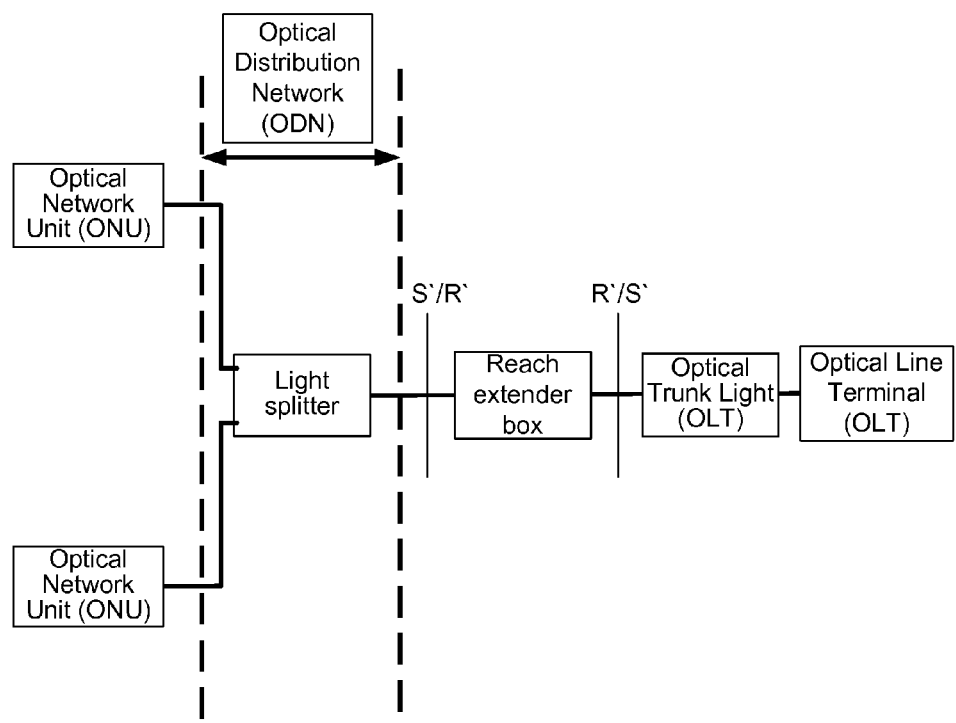
FIG. 1 shows a structure diagram of a long-distance passive optical network in the prior art.
Figure 2:
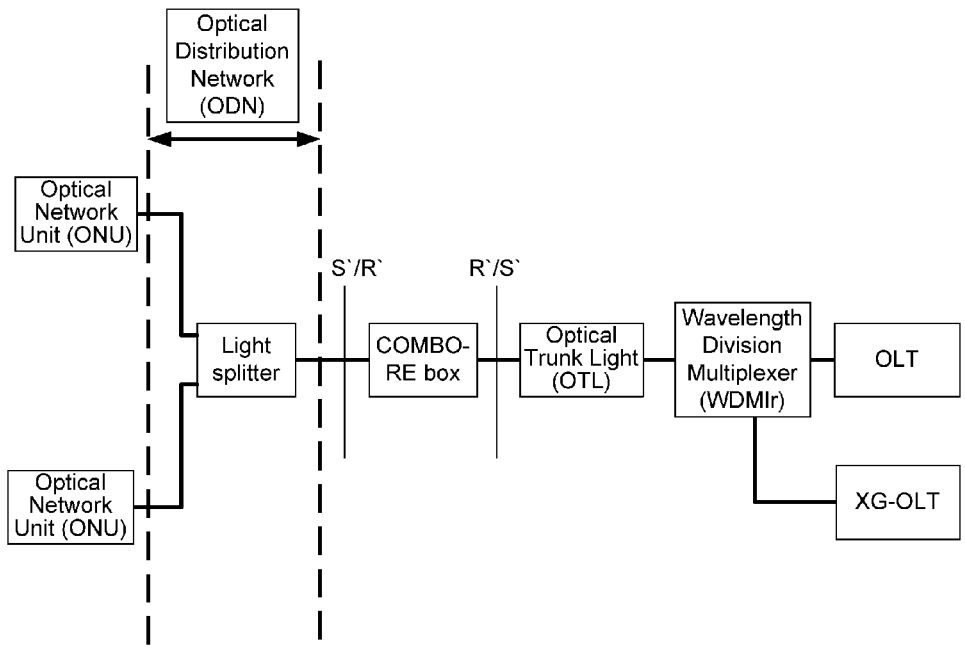
FIG. 2 shows a structure diagram of a coexisting long-distance passive optical network.
Figure 3:
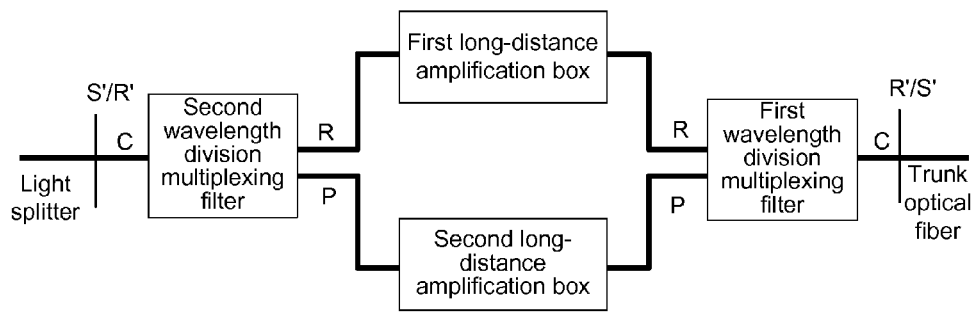
FIG. 3 shows a structure diagram of a long-distance box in the disclosure.

FIG. 3 shows a structure diagram of a long-distance box in the disclosure, as shown in FIG. 3, the long-distance box includes a long-distance amplification box and a wavelength division multiplexing filter, wherein, the wavelength division multiplexing filter is configured to split uplink/downlink light from different PON systems to different optical paths according to different wavelengths, and couple the uplink/downlink light from the different optical paths to a trunk optical fiber; each PON system has one corresponding optical path.

As the long-distance box as shown in FIG. 3 is an example in which two PON systems coexists, the optical path is divided into two optical paths, the wavelength division multiplexing filter includes a first wavelength division multiplexing filter and a second wavelength division multiplexing filter; wherein, the first wavelength division multiplexing filter splits the downlink light from the different PON systems and couples the uplink light from the different PON systems, and the second wavelength division multiplexing filter splits the uplink light from the different PON systems and couples the downlink light from the different PON systems.

The uplink/downlink light from the first PON system is transmitted through the first optical path, and the uplink/downlink light from the second PON system is transmitted through the second optical path. Long-distance amplification boxes corresponding to the first PON system and the second PON system are respectively arranged in the first optical path and the second optical path. The long-distance amplification boxes are configured to amplify the uplink/downlink light which passes through the PON systems and then output the uplink/downlink light.

Specifically:

the first wavelength division multiplexing filter is configured to split the downlink light from the different PON systems and couple the uplink light from the different PON systems: the uplink/downlink light from the first PON system is transmitted through the first optical path and amplified by the first long-distance amplification box, and the uplink/downlink light from the second PON system is transmitted through the second optical path and amplified by the second long-distance amplification box; and the uplink light transmitted through the first optical path and the second optical path is coupled to the trunk optical fiber through the first wavelength division multiplexing filter;

the second wavelength division multiplexing filter is configured to split the uplink light from the different PON systems and coupe the downlink light from the different PON systems: the uplink/downlink light from the first PON system is transmitted through the first optical path and amplified by the first long-distance amplification box, and the uplink/downlink light from the second PON system is transmitted through the second optical path and amplified by the second long-distance amplification box; and the downlink light transmitted through the first optical path and the second optical path is coupled to the trunk optical fiber through the second wavelength division multiplexing filter.

As the long-distance box as shown in FIG. 3 is an example in which two PON systems coexists, the first long-distance amplification box and the second long-distance amplification box are required to correspond to the first PON system and the second PON system respectively. The first long-distance amplification box or the second long-distance amplification box is completely identical to that used in an existing single-PON system, in which the long-distance amplification box may be an existing long-distance OEO box with optical-electronic-optical uplink/downlink, or an existing long-distance OA box with an OA, or a combination of a long-distance OEO box, a long-distance OA box and corresponding light guide devices. Wherein, the long-distance OEO amplification way means that the uplink and downlink lights from an original PON system are suspended in the long-distance OEO box and then converted into electric, and the data of the uplink and downlink lights are added to the uplink and downlink lights emitted by a new light module. In this way, attenuation of light and dispersion of light caused during transmission are eliminated, equivalently, light is amplified.

In the long-distance box in the disclosure, it is emphasized that, uplink/downlink light from different PON systems is split to different optical paths through wavelength division multiplexing filters and long-distance amplification boxes corresponding to the split PON systems are set in different optical paths, which provide a simple and reliable solution for operators to solve the long-distance problem caused by the coexistence of multiple PON systems; furthermore, long-distance amplification boxes of multiple existing single-PON systems are combined organically in the disclosure, modification for the system is slightest, reliability of the system is highest, and an efficiency of the system is highest, therefore time and cost are saved for the operators.

Besides, the long-distance box of the original single-PON system further includes a local controller and an Embedded Optical Network Terminal (EONT), which are configured to manage and control, by the OLT, different long-distance amplification boxes through the TAP coupler, the EONT and the local controller.

Here, the implementations of the EONT and the local controller belong to common knowledge for those skilled in the art and will not be described again, the specific implementation solutions of the EONT and the local controller are not intended to limit the scope of protection of the disclosure.

Figure 4:
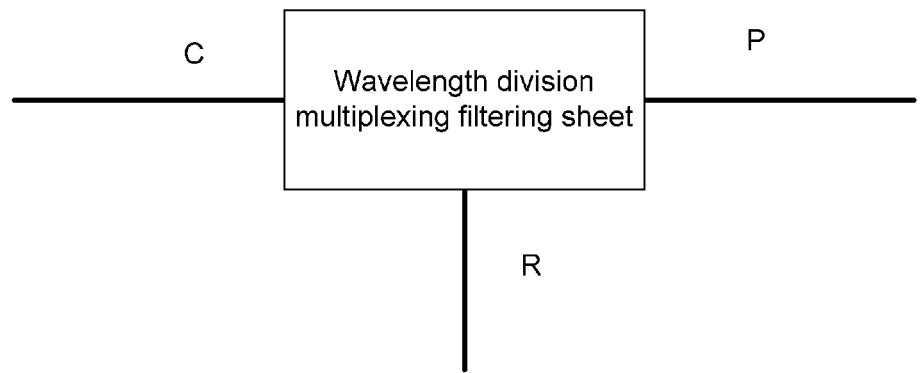
FIG. 4 shows a schematic diagram of an interface of a wavelength division multiplexing filter in the disclosure.

FIG. 4 shows a schematic diagram of an interface of a wavelength division multiplexing filter, as shown in FIG. 4, the design of the wavelength division multiplexing filter depends on the wavelength of the PON system, for example, for a PON system with coexistence of a GPON and an XG-PON, the wavelength division multiplexing filter may consist of a filtering sheet with double windows, the uplink/downlink light from the GPON is reflected by the wavelength division multiplexing filter, that is, the uplink/downlink light from the GPON is input/output only through an interface R of the wavelength division multiplexing filter, and, the uplink/downlink light from the XG-PON is transmitted by the wavelength division multiplexing filter, that is, the uplink/downlink light from the XG-PON is input/output only through an interface P of the wavelength division multiplexing filter. An interface C of the wavelength division multiplexing filter is connected with a trunk optical fiber at the R'/S' position. As shown in FIG. 4, if the first PON system and the second PON system are a GPON and an XG-PON respectively, the downlink wavelength of the GPON is 1480 nm-1500 nm and the uplink wavelength of the GPON is 1290 nm-1330 nm, while the downlink wavelength of the XG-PON is 1575 nm-1580 nm and the uplink wavelength of the XG-PON is 1260 nm-1280 nm. For the coexistence of the two PON systems, the wavelength division multiplexing filter consists of one filtering sheet with double windows, the universal interface of the wavelength division multiplexing filter, i.e., the interface C, is connected with the trunk optical fiber; the reflection interface, i.e., the interface R, is connected with the first optical path; and the transmission interface, i.e., the interface P, is connected with the second optical path.

Figure 5:
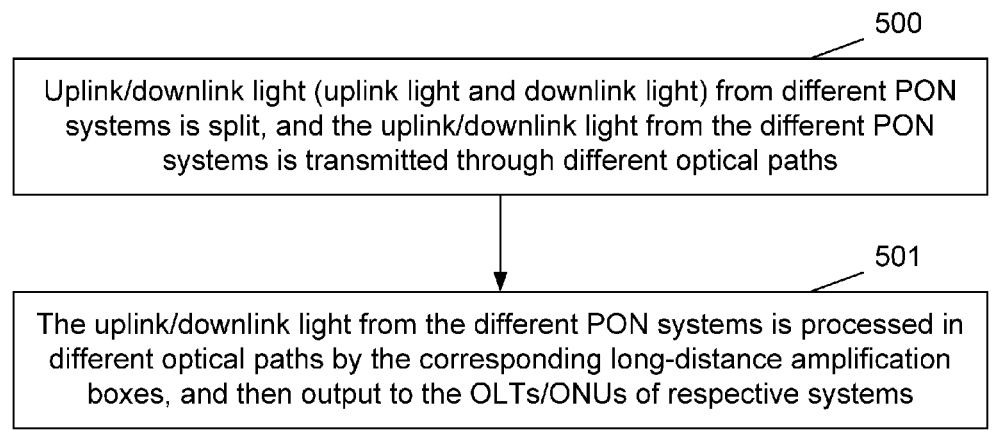
FIG. 5 shows a flow diagram of a method for processing unlink and downlink lights by using a long-distance box described in the disclosure.

With reference to FIG. 3 and FIG. 5, a working principle of the long-distance box in the disclosure will be described in detail by taking a PON system in which the first PON system and the second PON system coexist as an example thereafter.

The downlink light from the first PON system is emitted by the OLT of the first PON system, transmitted to the interface C of the first wavelength division multiplexing filter through the trunk optical fiber (OLT side), then output to the first optical path through the interface R of the first wavelength division multiplexing filter, and passed to the first long-distance amplification box corresponding to the first PON system, the amplified downlink light is output to the interface R of the second wavelength division multiplexing filter, then output to the trunk optical fiber through the interface C of the second wavelength division multiplexing filter, and finally transmitted to the ONU through a light splitter and a branch optical fiber.

The uplink light from the first PON system is emitted by the ONU of the first PON system, transmitted to interface C of the second wavelength division multiplexing filter through the branch optical fiber (ONU side) and the light splitter, output to the first optical path through the interface R of the second wavelength division multiplexing filter, and passed to the first long-distance amplification box corresponding to the first PON system, in the first long-distance amplification box, the amplified uplink light is output to the interface R of the first wavelength division multiplexing filter, then output to the trunk optical fiber through the interface C of the first wavelength division multiplexing filter, and finally transmitted to the OLT of the first PON system.

The downlink light from the second PON system is emitted by the OLT of the second PON system, transmitted to the interface C of the first wavelength division multiplexing filter through the trunk optical fiber, output to the second optical path through the interface P of the first wavelength division multiplexing filter, and passed to the second long-distance amplification box corresponding to the second PON system, in the second long-distance amplification box, the amplified downlink light is output to the interface P of the second wavelength division multiplexing filter, then output to the trunk optical fiber through the interface C of the second wavelength division multiplexing filter, and finally transmitted to the ONU through the light splitter and the branch optical fiber.

The uplink light from the second PON system is emitted by the ONU of the second PON system, transmitted to the interface C of the second wavelength division multiplexing filter through the branch optical fiber and the light splitter, output to the second optical path through the interface P of the second wavelength division multiplexing filter, and passed to the second long-distance amplification box corresponding to the second PON system, in the second long-distance amplification box, the amplified uplink light is output to the interface P of the first wavelength division multiplexing filter, then output to the trunk optical fiber through the interface C of the first wavelength division multiplexing filter, and finally transmitted to the OLT of the second PON system.

In the disclosure, multiple existing long-distance amplification boxes are combined organically through the wavelength division multiplexing filters, modification for the system is slightest, reliability of the system is highest, and an efficiency of the system is is highest, therefore time and cost are saved for the operators.

FIG. 5 shows a flow diagram of a method for processing unlink and downlink lights with a long-distance box described in the disclosure, as shown in FIG. 5, the method includes the following steps.

Step 500: uplink/downlink light (uplink light and downlink light) from different PON systems is split, and the uplink/downlink light from the different PON systems is transmitted through different optical paths.

In the step, the uplink/downlink light from the different PON systems is split, so that the uplink/downlink lights split can be processed by corresponding long-distance amplification boxes respectively for different PON systems.

Step 501: the uplink/downlink light from the different PON systems is processed in different optical paths by the corresponding long-distance amplification boxes, and then output to the OLTs/ONUs of respective systems.

It can be seen from the method of the disclosure as shown in FIG. 5 that, uplink/downlink light from different PON systems is split to different optical paths through wavelength division multiplexing filters and long-distance amplification boxes corresponding to the split PON systems are set in different optical paths, which provide a simple and reliable solution for operators to solve the long-distance problem caused by the coexistence of multiple PON systems; furthermore, long-distance amplification boxes of multiple existing single-PON systems are combined organically in the disclosure, modification for the system is slightest, reliability of the system is highest, and an efficiency of the system is highest, therefore time and cost are saved for the operators The above are only the preferred embodiments of the disclosure and are not intended to limit the scope of protection of the disclosure, and any modification, equivalent replacement and improvement made within the spirit and principle of the disclosure should be included within the scope of protection of the disclosure.

The invention claimed is:

1. A long-distance box for a Passive Optical Networks (PON) system in which different PONS coexist, wherein the long-distance box comprises a long-distance amplification box and a wavelength division multiplexing filter;
   the system in which the different PON systems coexist comprise a first PON system and a second PON system;
   the long-distance amplification box is configured to process uplink/downlink lights from PON systems, which passes through an optical path in which the long-distance amplification box is located, the long-distance amplification box comprises a first long-distance amplification box located in a first optical path and a second long-distance amplification box located in a second optical path;
   the wavelength division multiplexing filter comprises a first wavelength division multiplexing filter and a second wavelength division multiplexing filter; wherein, the first wavelength division multiplexing filter is configured to split the downlink lights and couple the uplink lights from different PON systems, the uplink/downlink light from the first PON system is transmitted through the first optical path and amplified by the first long-distance amplification box, and the uplink/downlink light from the second PON system is transmitted through the second optical path and amplified by the second long-distance amplification box; and the uplink lights transmitted through the first optical path and the second optical path are coupled to a trunk optical fiber through the first wavelength division multiplexing filter; and the second wavelength division multiplexing filter is configured to split the uplink lights and couple the downlink lights from different PON systems, the uplink/downlink light from the first PON system is transmitted through the first optical path and amplified by the first long-distance amplification box, and the uplink/downlink light from the second PON system is transmitted through the second optical path and amplified by the second long-distance amplification box; and the downlink lights transmitted through the first optical path and the second optical path are coupled to the trunk optical fiber through the second wavelength division multiplexing filter, wherein the wavelength division multiplexing filter consists of filtering sheets with double windows and comprises an interface R, an interface P and an interface C; the uplink/downlink light from the first PON system is reflected and input/output through the interface R, the uplink/downlink light from the second PON system is transmitted and input/output through the interface P; and the interface C is connected with the trunk optical fiber;

the interface C of the first wavelength division multiplexing filter is connected with the trunk optical fiber at an Optical Line Terminal (OLT) side, the interface R of the first wavelength division multiplexing filter is connected with one end of the first long-distance amplification box in the first optical path, and the interface P of the first wavelength division multiplexing filter is connected with one end of the second long-distance amplification box in the second optical path; the interface C of the second wavelength division multiplexing filter is connected with the trunk optical fiber at an Optical Network Unit (ONU) side, the interface R of the second wavelength division multiplexing filter is connected with the other end of the first long-distance amplification box in the first optical path, and the interface P of the second wavelength division multiplexing filter is connected with the other end of the second long-distance amplification box in the second optical path, wherein, the downlink light from the first PON system is emitted by the OLT of the first PON system, transmitted to the interface C of the first wavelength division multiplexing filter through the trunk optical fiber, output to the first optical path through the interface R of the first wavelength division multiplexing filter, output to the interface R of the second wavelength division multiplexing filter by the first long-distance amplification box corresponding to the first PON system, then output to the trunk optical fiber through the interface C of the second wavelength division multiplexing filter, and finally transmitted to the ONU through a light splitter and a branch optical fiber;

the uplink light from the first PON system is emitted by the ONU of the first PON system, transmitted to the interface C of the second wavelength division multiplexing filter through the branch optical fiber and the light splitter, output to the first optical path through the interface R of the second wavelength division multiplexing filter, output to the interface R of the first wavelength division multiplexing filter by the first long-distance amplification box corresponding to the first PON system, then output to the trunk optical fiber through the interface C of the first wavelength division multiplexing filter, and finally transmitted to the OLT of the first PON system;

the downlink light from the second PON system is emitted by the OLT of the second PON system, transmitted to the interface C of the first wavelength division multiplexing filter through the trunk optical fiber, output to the second optical path through the interface P of the first wavelength division multiplexing filter, output to the interface P of the second wavelength division multiplexing filter by the second long-distance amplification box corresponding to the second PON system, then output to the trunk optical fiber through the interface C of the second wavelength division multiplexing filter, and finally transmitted to the ONU through the light splitter and the branch optical fiber; and the uplink light from the second PON system is emitted by the ONU of the second PON system, transmitted to the interface C of the second wavelength division multiplexing filter through the branch optical fiber and the light splitter, output to the second optical path through the interface P of the second wavelength division multiplexing filter, output to the interface P of the first wavelength division multiplexing filter by the second long-distance amplification box corresponding to the second PON system, then output to the trunk optical fiber through the interface C of the first wavelength division multiplexing filter, and finally transmitted to the OLT of the second PON system.

2. The long-distance box according to claim 1, wherein the long-distance amplification box is an uplink/downlink Optical-Electrical-Optical (OEO) box belonging to the PON system, or an uplink/downlink Optical Amplification (OA) box, or a combination of uplink/downlink OEO box and OA box and corresponding light guide devices.

3. The long-distance box according to claim 2, wherein the first PON system is a G-PON (Gigabit PON) system; and the second PON system is a 10G-PON (ten-Gigabit PON) system.

4. A method for processing uplink and downlink light with the long-distance box, comprising:

splitting the uplink/downlink light from different PON systems, and transmitting the uplink/downlink light from different PON systems through different optical paths; and processing, by the corresponding long-distance amplification boxes, the uplink/downlink light from different PON systems in different optical paths, and then outputting to the OLTs/ONUs of respective systems, wherein the system in which the different PON systems coexist comprises a first PON system and a second PON system; the method specifically comprises:

emitting, by the OLT of the first PON system, the downlink light from the first PON system, transmitting the downlink light from the first PON system to an interface C of the first wavelength division multiplexing filter through the trunk optical fiber, outputting the downlink light from the first PON system to the first optical path through an interface R of the first wavelength division multiplexing filter, outputting the downlink light from the first PON system to an interface R of the second wavelength division multiplexing filter by the first long-distance amplification box corresponding to the first PON system, then outputting the downlink light from the first PON system to the trunk optical fiber through an interface C of the second wavelength division multiplexing filter, and finally transmitting the downlink light from the first PON system to the ONU through a light splitter and a branch optical fiber;

emitting, by the ONU of the first PON system, the uplink light from the first PON system, transmitting the uplink light from the first PON system to the interface C of the second wavelength division multiplexing filter through the branch optical fiber and the light splitter, outputting the uplink light from the first PON system to the first optical path through the interface R of the second wavelength division multiplexing filter, outputting the uplink light from the first PON system to the interface R of the first wavelength division multiplexing filter by the first long-distance amplification box corresponding to the first PON system, then outputting the uplink light from the first PON system to the trunk optical fiber through the interface C of the first wavelength division multiplexing filter, and finally transmitting the uplink light from the first PON system to the OLT of the first PON system;

emitting, by the OLT of the second PON system, the downlink light from the second PON system, transmitting the downlink light from the second PON system to the interface C of the first wavelength division multiplexing filter through the trunk optical fiber, outputting the downlink light from the second PON system to the second optical path through the interface P of the first wavelength division multiplexing filter, outputting the downlink light from the second PON system to the interface P of the second wavelength division multiplexing filter by the second long-distance amplification box corresponding to the second PON system, then outputting the downlink light from the second PON system to the trunk optical fiber through the interface C of the second wavelength division multiplexing filter, and finally transmitting the downlink light from the second PON system to the ONU through the light splitter and the branch optical fiber; and emitting, by the ONU of the second PON system, the uplink light from the second PON system, transmitting the uplink light from the second PON system to the interface C of the second wavelength division multiplexing filter through the branch optical fiber and the light splitter, outputting the uplink light from the second PON system to the second optical path through the interface P of the second wavelength division multiplexing filter, outputting the uplink light from the second PON system to the interface P of the first wavelength division multiplexing filter by the second long-distance amplification box corresponding to the second PON system, then outputting the uplink light from the second PON system to the trunk optical fiber through the interface C of the first wavelength division multiplexing filter, and finally transmitting the uplink light from the second PON system to the OLT of the second PON system.

* * * * *